Patented Dec. 9, 1930

1,784,423

UNITED STATES PATENT OFFICE

JOHN FREI, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS OF MAKING ALKYL CHLORIDES

No Drawing.    Application filed October 30, 1923. Serial No. 671,669.

This invention relates to the production of alkyl chlorides, and particularly those alkyl chlorides in which the alkyl group is that of a lower alcohol, that is an alkyl group, such as methyl or ethyl, having from 1 to 4 carbon atoms. My invention comprises heating hydrochloric acid with an alcohol, for example, ethyl alcohol, in the presence of a metal chloride of the character hereinafter defined, preferably ferric chloride. The temperature of the reaction mass is preferably maintained at a point such that the alkyl (ethyl) chloride produced will distill off as it is formed.

My new process is particularly advantageous when applied to the conversion into alkyl chlorides of the more volatile alcohols, such as methyl and ethyl alcohols, since it is ordinarily much more difficult to form the chlorides from these more volatile alcohols than from the alcohols having relatively high boiling points, such as amyl or hexyl alcohols.

I have discovered that certain metal chlorides are capable of acting as catalysts in the reaction which proceeds according to the following equation:

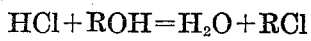

$$HCl + ROH = H_2O + RCl$$

where R is an alkyl radical.

Metal chlorides which have this catalytic action and which come within the scope of my invention may be defined by the following properties:

1. They are combinations of chlorine with polyvalent metals.
2. They are highly soluble in water; by which I mean that water solutions can be made therefrom having boiling points above 110° C.
3. They are stable in concentrated water solution, that is, they are not extensively hydrolyzed by water.
4. They are combinations of chlorine with metals which lie between chromium and bismuth in the electromotive series as defined on page 362 of General Inorganic Chemistry by Alexander Smith (1906).
5. They are capable in aqueous solutions of retaining (i. e. preventing the vaporization of) alcohols at temperatures well above the boiling points of the respective alcohols, probably by an ability to form loose addition products with the alcohols.

The metal chlorides having the above characteristics are cadmium chloride, ferric chloride, stannous chloride, stannic chloride, antimony trichloride, and antimony pentachloride.

I have found that if I add to the aqueous solution of one of the above mentioned metal chlorides at a temperature from 110 to 150° C. a mixture of strong hydrochloric acid and methyl or ethyl alcohol, the alcohol does not escape but is kept back until it has reacted with the hydrochloric acid under the influence of the high temperature, forming an alkyl chloride. By maintaining the starting temperature, not only the alkyl chloride will distill off, but also the reaction water and the water from the hydrochloric acid, thus leaving the metal chloride solution unchanged and ready for another addition of acid-alcohol mixture. The addition of fresh acid-alcohol mixture can be made continuously, thereby forming a continuous process.

By the expression "strong hydrochloric acid" in the preceding paragraph, I mean a hydrochloric acid containing from about 20 to 35% HCl. It will be understood, however, that my invention is not limited to the use of strong hydrochloric acid inasmuch as more dilute acid can be used, although to less advantage.

My process may be illustrated by the following example:

A ferric chloride solution of such a concentration that its boiling point is about 140° C. is heated to that temperature in an acid proof container. In a steady stream we let run in a mixture of strong hydrochloric acid with ordinary ethyl alcohol, the former slightly in excess, taking care that the iron chloride solution is kept boiling and the temperature does neither rise nor fall considerably. A regular development of ethyl chloride starts and the latter distills off with water and a little unchanged alcohol. By fractional condensation and washing, the ethyl chloride is obtained practically pure and in a good yield.

Very little ether is produced by this process.

I have found that the most convenient method of heating the metal chloride solution is to heat by electricity using alternating current and the solution itself as a resistance. No electrolysis interferes with the reaction.

Instead of using methyl or ethyl alcohol, I can, as above indicated, carry out my new process using normal or iso-propyl alcohol, or normal or iso-butyl alcohol. Although I have described my process in considerable detail, it will be understood that my invention is not thereby limited.

I claim:

1. The process of making an alkyl chloride which comprises heating above 110° C. a mixture of a water solution of hydrochloric acid and a lower alcohol in the presence of ferric chloride, while permitting the escape of the water vapors formed.

2. The process of making an alkyl chloride which comprises adding a mixture of a lower alcohol and strong hydrochloric acid to an aqueous solution of ferric chloride at a temperature between about 110° and 150° C., and maintaining the temperature between 110° and 150° C. to distill off the alkyl chloride formed and also water.

3. A process according to claim 1 in which the lower alcohol contains a whole number of carbon atoms between 0 and 3.

4. A process according to claim 1 in which the lower alcohol is ethyl alcohol.

5. A process according to claim 2 in which the lower alcohol contains a whole number of carbon atoms between 0 and 3.

6. The process of making an alkyl chloride which comprises adding a mixture of aqueous hydrochloric acid and a lower alcohol to a water solution of a stable, highly water-soluble metal chloride capable, in water solution, of preventing vaporization of methyl and ethyl alcohols at temperatures well above the boiling points of said alcohols, the metal component of said chloride being a polyvalent metal coming between chromium and bismuth in the electromotive series, said solution being maintained at a temperature sufficiently high to prevent substantial accumulation of water in the reaction mixture.

7. The process of making an alkyl chloride which comprises adding a mixture of strong aqueous hydrochloric acid and a lower alcohol at a temperature between 110 and 150° C. to a water solution of a stable, highly water-soluble metal chloride capable, in water solution, of preventing vaporization of methyl and ethyl alcohols at temperatures well above the boiling points of said alcohols, said chloride being further characterized by being the chloride of a polyvalent metal coming between chromium and bismuth in the electromotive series.

8. A process according to claim 6 in which the lower alcohol contains a whole number of carbon atoms between 0 and 3.

9. A process according to claim 7 in which the lower alcohol contains a whole number of carbon atoms between 0 and 3.

10. A process according to claim 7 in which the lower alcohol is ethyl alcohol.

11. The process of producing an organic chloride comprising reacting the corresponding primary alcohol with a hydrated ferric chloride in the presence of free hydrochloric acid, while driving off the water formed during the reaction.

12. The process of continuously forming an alkyl chloride which comprises reacting an aliphatic alcohol with hydrochloric acid in the presence of an aqueous solution of ferric chloride having a boiling point above 110° C., while maintaining the temperature of the reaction above 110° C. so that the alkyl chloride and the reaction water formed will continuously distill off while the unreacted alcohol is retained by the unchanged ferric chloride solution.

13. The process of claim 12 where the alcohol is ethyl alcohol.

14. The process of continuously forming ethyl chloride which comprises reacting ethyl alcohol with hydrochloric acid within a solution of ferric chloride having a boiling point of about 140° C., while maintaining said temperature so that ethyl chloride and the reaction water formed will distill off continuously while the unreacted alcohol is retained by the unchanged ferric chloride solution.

15. The process of continuously forming an organic chloride which comprises reacting an alcohol with hydrochloric acid in the presence of an aqueous solution of a metallic chloride having a boiling point about 110° C., said metal lying between chromium and bismuth in the electromotive series, and maintaining the temperature of the reaction at the boiling point of the metallic chloride solution so that the organic chloride and the reaction water formed will continuously distill off while the unreacted alcohol is retained by the unchanged chloride solution.

16. The process of continuously forming an alkyl chloride which comprises reacting an aliphatic alcohol with hydrochloric acid in the presence of an aqueous solution of antimony trichloride having a boiling point above 110° C., while maintaining the temperature of the reaction above 110° C. so that the alkyl chloride and the reaction water formed will continuously distill off while the unreacted alcohol is retained by the unchanged antimony trichloride solution.

17. The process of continuously forming an alkyl chloride which comprises reacting an aliphatic alcohol with hydrochloric acid in the presence of an aqueous solution of tin chloride having a boiling point above 110° C., while maintaining the temperature of the reaction above 110° C. so that the alkyl chloride and the reaction water formed will continuously distill off while the unreacted alcohol is retained by the unchanged tin chloride solution.

In testimony whereof I affix my signature.

JOHN FREI.